United States Patent
Li et al.

(10) Patent No.: US 10,651,732 B2
(45) Date of Patent: *May 12, 2020

(54) CHARGE PUMPS AND METHODS OF OPERATING CHARGE PUMPS

(71) Applicant: MICRON TECHNOLOGY, INC., Boise, ID (US)

(72) Inventors: Ming H. Li, Boise, ID (US); Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,721

(22) Filed: May 16, 2019

(65) Prior Publication Data

US 2019/0273434 A1    Sep. 5, 2019

Related U.S. Application Data

(60) Continuation of application No. 15/927,150, filed on Mar. 21, 2018, now Pat. No. 10,389,238, which is a division of application No. 14/193,109, filed on Feb. 28, 2014, now Pat. No. 9,954,437.

(51) Int. Cl.
 *H02M 3/07* (2006.01)
 *H02M 1/00* (2006.01)

(52) U.S. Cl.
 CPC .... *H02M 3/073* (2013.01); *H02M 2001/0041* (2013.01)

(58) Field of Classification Search
 CPC ....... H02M 2003/075–078; H02M 2001/0006; H02M 3/073; G05F 3/02; G05F 3/04; G05F 3/06; G05F 3/08; G05F 3/10; G05F 3/12; G05F 3/16; G05F 3/18; G05F 3/185; G05F 3/20; G05F 3/205; G05F 3/22; G05F 3/222; G05F 3/225; G05F 3/227; G05F 3/24; G05F 3/26; G05F 3/262; G05F 3/265; G05F 3/267; G05F 3/30

See application file for complete search history.

(56) References Cited

U.S. PATENT DOCUMENTS

| | | | | |
|---|---|---|---|---|
| 5,446,418 | A | * | 8/1995 | Hara .................... H03K 3/0315 331/57 |
| 5,661,428 | A | | 8/1997 | Li et al. |
| 5,982,162 | A | * | 11/1999 | Yamauchi ............... G05F 1/465 323/280 |
| 6,320,797 | B1 | | 11/2001 | Liu |
| 6,323,709 | B1 | | 11/2001 | Kulkarni et al. |
| 7,741,871 | B2 | | 6/2010 | Morita |
| 2001/0046165 | A1 | * | 11/2001 | Rolandi ................. G11C 5/145 365/200 |
| 2002/0008547 | A1 | | 1/2002 | Shimano et al. |

(Continued)

*Primary Examiner* — Patrick C Chen
(74) *Attorney, Agent, or Firm* — Dicke, Billig & Czaja, PLLC

(57) ABSTRACT

Methods of operating a charge pump, and charge pumps configured to perform similar methods, involve monitoring a level of a supply voltage of the charge pump, and turning off an oscillator of the charge pump responsive to the level of the supply voltage dropping below a certain level, wherein turning off the oscillator comprises setting an inverter in a ring oscillator loop of the oscillator to a steady state output.

17 Claims, 5 Drawing Sheets

(56) References Cited

U.S. PATENT DOCUMENTS

| | | | |
|---|---|---|---|
| 2002/0033725 A1* | 3/2002 | Taito | H02M 3/07 327/291 |
| 2002/0047731 A1 | 4/2002 | Okamoto et al. | |
| 2003/0198117 A1 | 10/2003 | Hagura et al. | |
| 2006/0061422 A1 | 3/2006 | Cho et al. | |
| 2010/0301893 A1* | 12/2010 | Otsuga | G01R 31/31721 324/750.3 |
| 2014/0253190 A1 | 9/2014 | Chen et al. | |

* cited by examiner

CHARGE PUMPS AND METHODS OF OPERATING CHARGE PUMPS

RELATED APPLICATIONS

This Application is a Continuation of U.S. application Ser. No. 15/927,150, titled "CHARGE PUMPS AND METHODS OF OPERATING CHARGE PUMPS," filed Mar. 21, 2018, now U.S. Pat. No. 10,389,238 issued on Aug. 20, 2019, which is a Divisional of U.S. application Ser. No. 14/193,109, titled "CHARGE PUMP," filed Feb. 28, 2014, now U.S. Pat. No. 9,954,437 issued on Apr. 24, 2018, which are commonly assigned and incorporated herein by reference.

FIELD

The present disclosure relates generally to charge pumps and in particular the present disclosure relates to charge pumps in dual supply devices.

BACKGROUND

Integrated circuits often require supply voltages of greater potential than that provided by an external voltage source. Memory circuits such as dynamic random access memories (DRAMs) and video DRAMs require higher internal voltages to pre-charge memory word lines and the like. Integrated circuits which are used in systems dependent upon a limited external power supply, such as a battery, must generate the additional supply voltages using conversion circuitry. Charge pumps are known in the art as on-chip voltage generators capable of providing a voltage more positive than the most positive external supply or more negative than the most negative external supply. New generation integrated circuits used in densely populated devices, such as portable computers and phones, require low voltage operation and reduced power consumption.

FIG. 1 is a typical prior art charge pump diagram. Charge pump 100 comprises a control circuit 102, an oscillator circuit 204, and a pump core 106, coupled in series. A typical charge pump such as pump 100 operates in two different voltage domains: a low supply voltage domain (called a Vcc domain herein) and a high supply voltage domain (called a Vccx domain herein). The control circuit decodes pump core runaway and float mode trim settings (discussed later) from tmfzVccp<0:2> (e.g., in Vcc domain) and uses them to control an oscillator enable signal (e.g., in Vccx domain) that is provided to oscillator 104. Accordingly, the sense circuit 102 includes a level shifter (not shown). The oscillator generates an oscillating signal that is provided to the pump core 106 to generate the charge pump voltage Vccp. The pump core generates a current to charge a power bus. The runaway mode trim setting allows the charge pump to be turned on despite the Vccp level, and the float mode trim setting allows the charge pump to be shut off despite the Vccp level.

A level shifter has a weakness when the Vccx domain voltage and the Vcc domain voltage get to levels that are outside of the specification for those voltages. When this happens, the oscillator may act erratically, randomly turning the pump on or off, and potentially elevating the pump voltage Vccp to a level higher than its target voltage. This typically happens in a power-up or power-down situation, or when a mobile device, for example, is entering a deep power down mode. A high Vccp voltage can cause reliability issues. For example, when a device powers down or enters a deep power down mode, the Vcc and Vccx signals initially float, then ramp down to 0. Depending upon the amount of leakage on a power bus, the Vcc and Vccx signals may drop at different rates. When the voltages ramp down at different rates, the level shifter used in association with generating the signal for turning the pump core on or off may malfunction if the Vccx level is still above a trip point when the Vcc level drops below the trip point. In this situation, the oscillator circuit may still oscillate, and the pump core may pump, pushing the pump voltage above its target voltage.

In a typical charge pump, a comparator is used to compare the pump voltage to a reference level, to turn the oscillator on or off depending upon the compared levels. The output of the comparator is used with another signal to generate runaway and float signals. If the level shifter malfunctions, the oscillator could continue to run when it is supposed to be shut off.

In prior art designs, a power up level translator (PULT) signal generation circuit is used to turn off the oscillator when a malfunctioning level shifter is detected. The PULT typically consumes a steady amount of DC current since it is always on. With the increased use of mobile devices, a PULT solution is undesirable. Still further, a PULT takes a relatively large amount of space on a die. Also, if the PULT does not trip before the level shifter trip point, it becomes ineffective. Alternatively, a resistor based level shifter may be used on the oscillator. This takes up even more die space, and also consumes DC current, but is reliably operated.

For the reasons stated above, and for other reasons stated below which will become apparent to those skilled in the art upon reading and understanding the present specification, there is a need in the art for improved control of runaway and float modes in charge pumps.

DETAILED DESCRIPTION

Figure 1:
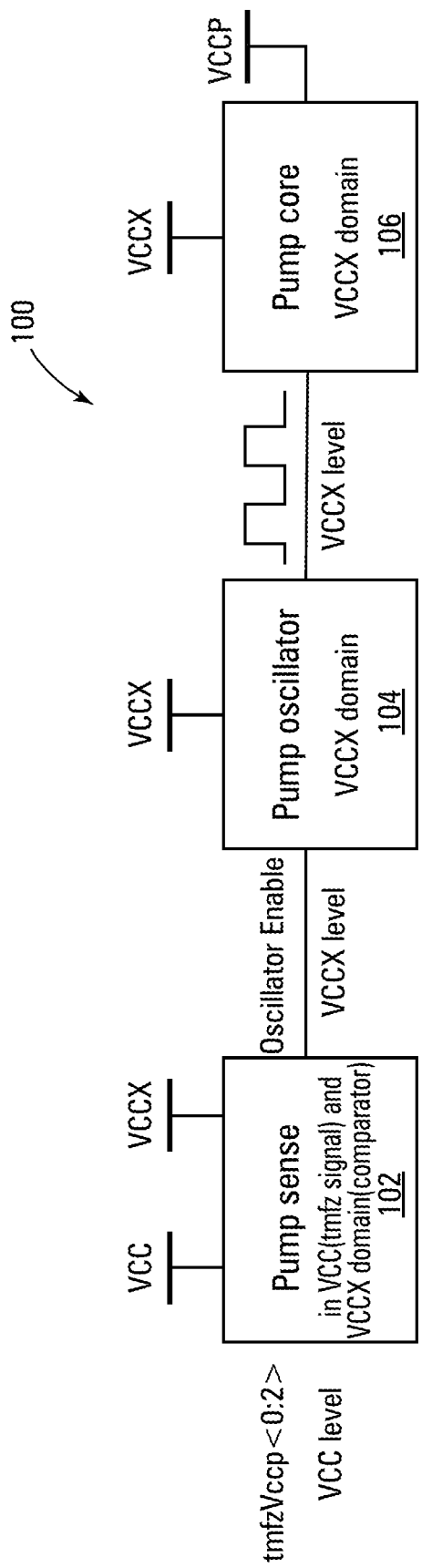
FIG. 1 is a block diagram of a typical charge pump.

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present disclosure is defined only by the appended claims, along with the full scope of equivalents to which such claims are entitled.

Figure 2:
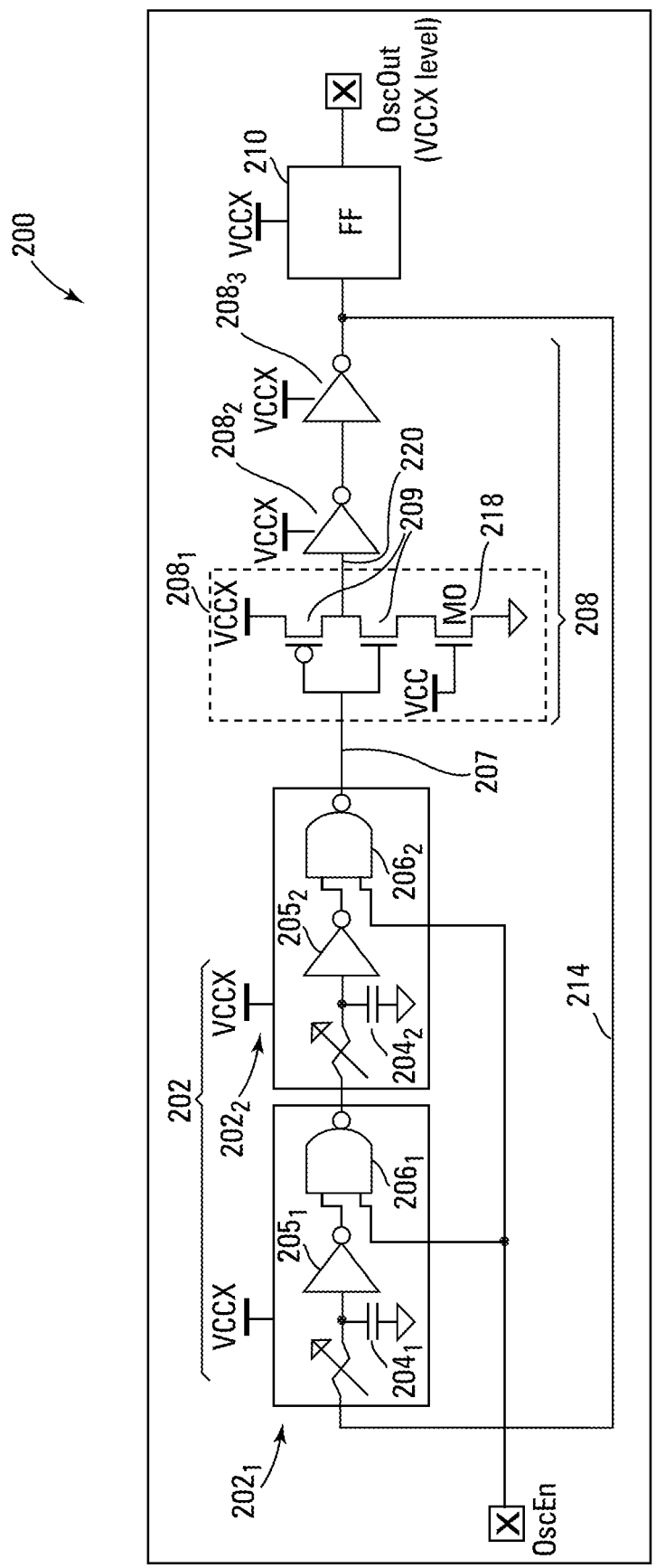
FIG. 2 is a block diagram of a charge pump oscillator according to an embodiment of the present disclosure.

A charge pump oscillator 200 according to an embodiment of the disclosure is shown in greater detail in FIG. 2. Charge pump oscillator 200 comprises at least one delay element 202, a plurality of inverters 208, and a flip flop 210.

The at least one delay element (two delay elements $202_1$ and $202_2$ are shown in the Figure), the plurality of inverters 208 (three inverters $208_1$, $208_2$, and $208_3$, are shown in the Figure), and the flip flop 210 are in one embodiment coupled in series, and an output 220 of a one $208_3$ of the plurality of inverters is coupled in a feedback loop on line 214 to a first $202_1$ of the at least one delay element. Inverter $208_1$ of the plurality of inverters is coupled in one embodiment to a transistor 218 gate coupled to a first supply voltage Vcc, the transistor 218 coupled in series with its inverter transistors 209 between a second supply voltage Vccx, higher than the first supply voltage Vcc, and a reference voltage 211, in one embodiment ground. Delay elements 202 comprise in one embodiment an RC (resistor/capacitor) circuit 204, an inverter 205 and a NAND gate 206, an output of the inverter 205 coupled to one of the NAND gate 206 inputs, and an oscillator enable signal coupled to the other of the NAND gate 206 inputs. An output 207 of the final delay element $202_2$ of the plurality of delay elements is input to inverter $208_1$. A ring oscillator loop of the charge pump oscillator 200 comprises the delay elements 202, the inverters 208, and the feedback line 214.

A charge pump including such an oscillator circuit 200 is thus configured to monitor a first supply voltage level Vcc supplied thereto, and to turn off an oscillator of the charge pump responsive to (e.g., when) the first supply voltage dropping below a certain level. In operation, responsive to the supply voltage Vcc dropping below the trip point of the transistor 218, for example, once Vcc drops below a turn-on point for transistor 218, transistor 218 turns off, and pulls the inverter $208_1$ to a steady state high output at 220, thus shutting off the charge pump oscillator.

In operation, when a situation in which the supply voltage Vcc drops, and the second supply voltage Vccx is still larger than the threshold voltage of the inverter, the transistor 218 turns off, even if Vccx has not fallen as far as Vcc. Without an oscillating signal, the charge pump oscillator will not generate a current, and therefore, runaway pump oscillator issues that can cause problems or even part failure can be avoided.

The ring oscillator loop, as described above, comprises the pull-down transistor 218 in the embodiment of FIG. 2. In this embodiment, the addition of the pull-down transistor 218 allows the charge pump oscillator circuitry to be much smaller than traditional charge pump oscillator circuitry using PULT, on the order of approximately 0.62% the size of a charge pump using a power up level translator as discussed above, and approximately 0.41% the size of a charge pump using a resistor based level shifter. In contrast to the PULT and resistor based level shifters, the embodiment of FIG. 2 does not require extra DC current, and does not require extra global routing.

Figure 3:
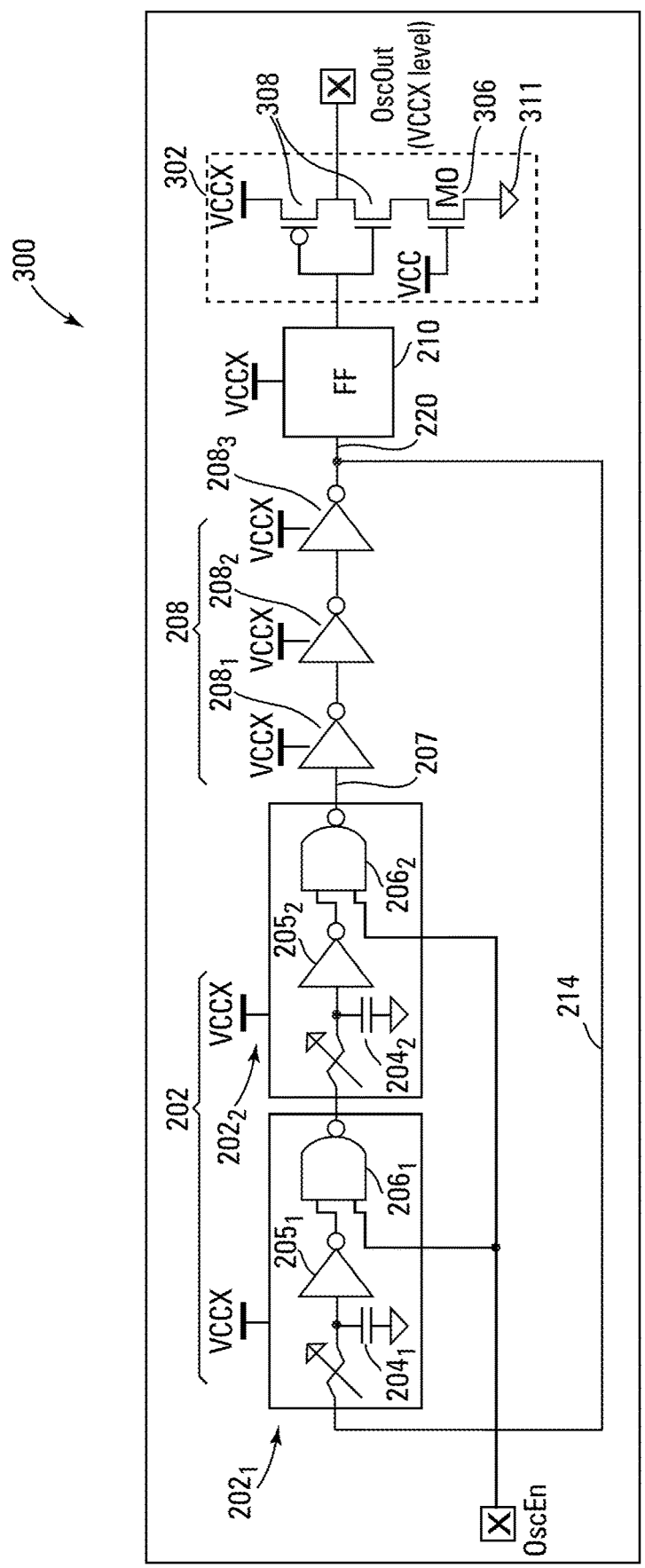
FIG. 3 is a block diagram of a charge pump oscillator according to another embodiment of the present disclosure.

A charge pump oscillator 300 according to another embodiment of the disclosure is shown in greater detail in FIG. 3. Charge pump oscillator 300 is very similar to charge pump oscillator 200, and comprises at least one delay element 202, a plurality of inverters 208, and a flip flop 210. The at least one delay element (two delay elements $202_1$ and $202_2$ are shown in the Figure), the plurality of inverters 208 (three inverters $208_1$, $208_2$, and $208_3$, are shown in the Figure), and the flip flop 210 are in one embodiment coupled in series, and an output 220 of a one $208_3$ of the plurality of inverters is coupled in a feedback loop 214 to a first $202_1$ of the at least one delay element.

An additional inverter 302 is coupled in series at an output of the flip flop 210 and the oscillator output. Inverter 302 is coupled in one embodiment to a transistor 306, which is gate coupled to a first supply voltage Vcc. The transistor 306 is coupled in series with its inverter transistors 308 between a second supply voltage Vccx, higher than the first supply voltage Vcc, and a reference voltage 311, in one embodiment ground. Delay elements 202 comprise in one embodiment an RC (resistor/capacitor) circuit 204, an inverter 205 and a NAND gate 206, an output of the inverter 205 coupled to one of the NAND gate 206 inputs, and an oscillator enable signal coupled to the other of the NAND gate 206 inputs. An output 207 of the final delay element $202_2$ of the plurality of delay elements is input to inverter $208_1$.

A charge pump including such an oscillator circuit 300 is thus configured to monitor a first supply voltage level Vcc supplied thereto, and to turn off an oscillator of the charge pump responsive to (e.g., when) the first supply voltage dropping below a certain level. In operation, responsive to the supply voltage Vcc dropping below the trip point of the transistor 306, for example, once Vcc drops below a turn-on point for transistor 306, transistor 306 turns off, and pulls the inverter to a steady state high output at 304, thus shutting off the charge pump oscillator.

A ring oscillator loop of the charge pump oscillator 300 comprises the delay elements 202, the inverters 208, and the feedback line 214. In contrast to the charge pump oscillator 200 of FIG. 2, the charge pump oscillator 300 of FIG. 3 has a steady state output inverter outside the ring oscillator loop, instead of inside the ring oscillator loop as in FIG. 2. This configuration allow the charge pump oscillator to be placed in a steady state output without placing the pull down transistor in the ring oscillator loop. Therefore, the oscillator speed at the corners (e.g., slow slow corners, or the like) is not affected as may be the case with the charge pump oscillator 200 (which may lead to more pump cores being added in an embodiment that utilizes charge pump oscillator 200 as compared to an embodiment that utilizes charge pump oscillator 300). While the layout uses an additional inverter, and is therefore larger than the embodiment of FIG. 2, still, the addition of the pull-down transistor 306 allows the charge pump oscillator circuitry to be much smaller than traditional charge pump oscillator circuitry using PULT, on the order of approximately 2.85% the size of a charge pump using a power up level translator as discussed above, and approximately 1.90% the size of charge pump using a resistor based level shifter. In contrast to the PULT and resistor based level shifters, and like the embodiment of FIG. 2, the embodiment of FIG. 3 does not require extra DC current, and does not require extra global routing.

In certain circumstances, because the rising edge of the oscillator goes through the PMOS transistor of the inverter, and the falling edge of the oscillator goes through the NMOS transistor of the inverter and transistor 306, pull-down may take longer than pull-up, especially at a lower supply voltage. However, provided that the supply voltage is properly set, which can be done at testing, the duty cycle for the oscillator can be maintained at 50%. That is, provided the low supply voltage is sufficient to maintain the duty cycle at 50% given some amount of margin (determined again at testing), the longer pull-down time versus pull-up time should not be relevant.

Figure 4:
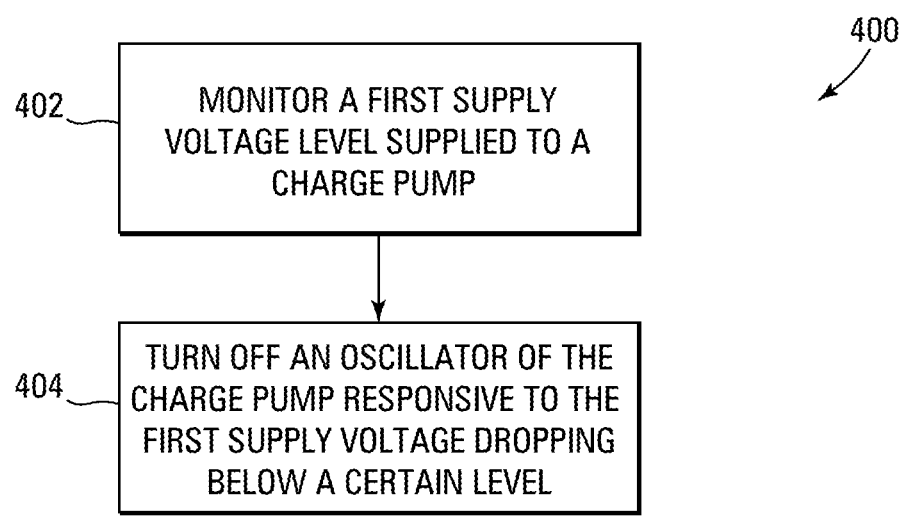
FIG. 4 is a flow chart diagram of a method according to an embodiment of the present disclosure.

One embodiment of a method 400 for operating a charge pump is shown in FIG. 4. Method 400 comprises monitoring a first supply voltage level supplied to a charge pump in block 402, and turning off an oscillator of the charge pump responsive to the first supply voltage dropping below a certain level in block 404. In one embodiment, turning off the oscillator comprises setting an output of an inverter in an oscillator circuit of the charge pump to a steady state output.

The inverter may be an inverter within a ring oscillator loop of the oscillator circuit, such as inverter 218 shown in FIG. 2, or an inverter outside of the ring oscillator loop, such as inverter 306 shown in FIG. 3. In the case of the inverters shown in FIGS. 2 and 3, setting the inverter to a steady state output comprises in one embodiment turning off a transistor coupled in series with the inverter. This is performed in one embodiment by coupling the gate of the transistor of the inverter to be set to a steady state output to a supply voltage Vcc for the charge pump, that supply voltage Vcc being less than a second supply voltage Vccx, as described above. The transistor turns off responsive to the first supply voltage dropping below a turn-on voltage for the transistor.

Figure 5:
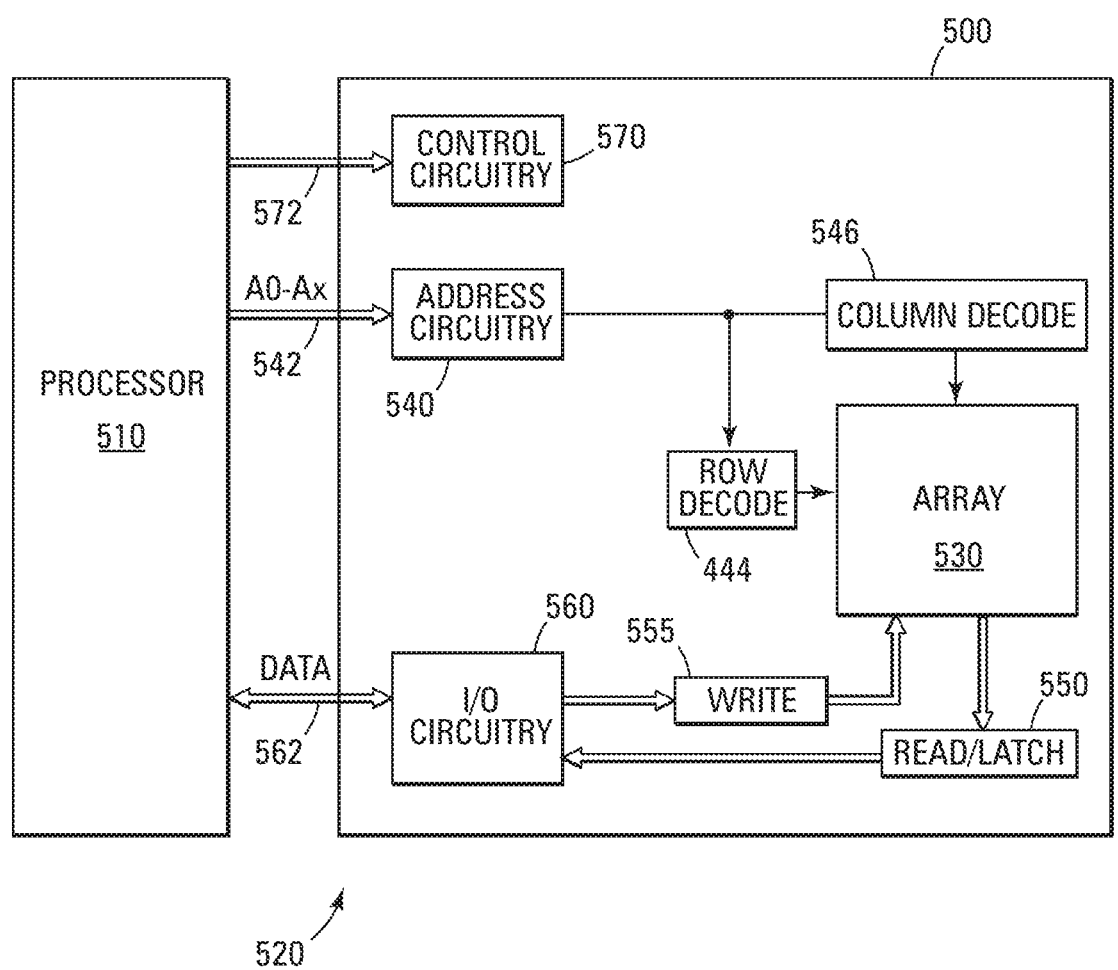
FIG. 5 is a block diagram of a memory device using a charge pump according to an embodiment of the present disclosure.

A charge pump including a charge pump oscillator such as those shown in FIGS. 2 and 3 may be used in various embodiments in a memory device, such as that shown in FIG. 5. Memory device 500 is a functional block diagram of a memory device 500, such as a flash memory device, of one embodiment of the present invention, and on which various method embodiments may be practiced, which is coupled to a processor 510. The memory device 500 and the processor 510 may form part of an electronic system 520. The memory device 500 has been simplified to focus on features of the memory that are helpful in understanding the present invention. The memory device includes an array of memory cells 530 having a charge pump including a charge pump oscillator such as those shown in FIGS. 2 and 3 and described herein. The memory array 530 is arranged in banks of rows and columns.

An address buffer circuit 540 is provided to latch address signals provided over I/O connections 562 through I/O circuitry 560. Address signals are received and decoded by row decoder 544 and a column decoder 546 to access the memory array 530. It will be appreciated by those skilled in the art, with the benefit of the present description, that the number of address input connections depends upon the density and architecture of the memory array. That is, the number of addresses increases with both increased memory cell counts and increased bank and block counts.

The memory device reads data in the array 530 by sensing voltage or current changes in the memory array columns using sense/latch circuitry 550. The sense/latch circuitry, in one embodiment, is coupled to read and latch a row of data from the memory array. Data input and output buffer circuitry 560 is included for bi-directional data communication over a plurality of data (DQ) connections 562 with the processor 510, and is coupled to write circuitry 555 and sense/latch circuitry 550 for performing read and write operations on the memory 500.

Command control circuit 570 decodes signals provided on control connections 572 from the processor 510. These signals are used to control the operations on the memory array 530, including data read, data write, and erase operations. The flash memory device has been simplified to facilitate a basic understanding of the features of the memory. A more detailed understanding of internal circuitry and functions of flash memories are known to those skilled in the art.

CONCLUSION

Charge pumps have been described that include a pull-down transistor series coupled with an inverter either within or outside of a ring oscillator loop. One such charge pump operates to control a runaway pump situation by setting an inverter output to a steady state when a supply voltage drops below a trip point before a second, higher, supply voltage drops below the trip point.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for operating a charge pump, comprising:
   monitoring a level of a first supply voltage of a charge pump; and
   turning off an oscillator of the charge pump responsive to the level of the first supply voltage dropping below a certain level, wherein turning off the oscillator comprises setting an inverter in a ring oscillator loop of the oscillator to a steady state output;
   wherein the oscillator is configured to receive a second supply voltage higher than the first supply voltage during normal operation of the charge pump; and
   wherein a voltage level of the first supply voltage is independent of a voltage level of the second supply voltage.

2. The method of claim 1, wherein setting the inverter to the steady state output comprises setting the inverter to the steady state output regardless of whether an output of the ring oscillator loop comprises an oscillating signal.

3. The method of claim 1, wherein the oscillator is configured to output a signal having a voltage level of the second supply voltage.

4. The method of claim 1, wherein setting the inverter to the steady state output comprises turning off a particular transistor coupled in series with transistors of the inverter.

5. The method of claim 4, wherein turning off the particular transistor comprises gate coupling the particular transistor to the first supply voltage, and turning the particular transistor off when the first supply voltage drops below a turn-on voltage of the particular transistor.

6. A method for operating a charge pump, comprising:
   monitoring a level of a first supply voltage of a charge pump; and
   turning off an oscillator of the charge pump responsive to the level of the first supply voltage dropping below a certain level, wherein turning off the oscillator comprises setting an inverter of a plurality of inverters in a ring oscillator loop of the oscillator to a steady state output;
   wherein the oscillator is configured to receive a second supply voltage higher than the first supply voltage during normal operation of the charge pump; and
   wherein a voltage level of the first supply voltage is independent of a voltage level of the second supply voltage.

7. The method of claim 6, wherein setting the inverter of the plurality of inverters in the ring oscillator loop of the oscillator to the steady state output comprises setting the inverter to the steady state output regardless of whether an output of the ring oscillator loop comprises an oscillating signal.

8. The method of claim 6, the oscillator is configured to output a signal having a voltage level of the second supply voltage.

9. The method of claim 6, wherein setting the inverter to the steady state output comprises gate coupling a particular transistor coupled in series with transistors of the inverter to the first supply voltage, and turning the particular transistor off when the first supply voltage drops below a turn-on voltage of the particular transistor.

10. A charge pump, comprising:
   a delay element;
   a plurality of inverters; and
   a flip flop, the delay element, the plurality of inverters, and the flip flop coupled in series, and an output of a one of the plurality of inverters coupled in a feedback loop to the delay element;
   wherein the charge pump is configured to monitor a level of a first supply voltage, and to turn off an oscillator of the charge pump responsive to the level of the first supply voltage dropping below a certain level;
   wherein the delay element, the plurality of inverters, and a feedback line coupled from the output of the one of the plurality of inverters to an input of the delay element comprise a ring oscillator loop, and wherein the oscillator includes the ring oscillator loop;
   wherein the oscillator is configured to receive a second supply voltage higher than the first supply voltage during normal operation of the charge pump; and
   wherein a voltage level of the first supply voltage is independent of a voltage level of the second supply voltage.

11. The charge pump of claim 10, wherein the charge pump is configured to set the inverter in the ring oscillator loop by turning off a particular transistor coupled in series with transistors of that inverter.

12. The charge pump of claim 11, wherein the charge pump being configured to turn off the particular transistor comprises a gate of the particular transistor being coupled to a node configured to receive the first supply voltage.

13. The charge pump of claim 10, wherein the delay element comprises a plurality of delay elements.

14. The charge pump of claim 10, wherein the oscillator is further configured to receive an oscillator enable signal and the first supply voltage, and to output a signal having a voltage level of the second supply voltage.

15. The charge pump of claim 14, wherein the delay element is configured to receive the oscillator enable signal.

16. The charge pump of claim 14, further comprising:
   a control circuit configured to provide the oscillator enable signal to the oscillator; and
   a pump core configured to receive an oscillating signal provided by the oscillator.

17. The charge pump of claim 10, wherein the one of the plurality of inverters having the output coupled in the feedback loop to the delay element is further coupled between the delay element and the flip flop.

* * * * *

UNITED STATES PATENT AND TRADEMARK OFFICE
CERTIFICATE OF CORRECTION

PATENT NO. : 10,651,732 B2
APPLICATION NO. : 16/413721
DATED : May 12, 2020
INVENTOR(S) : Li et al.

Page 1 of 1

It is certified that error appears in the above-identified patent and that said Letters Patent is hereby corrected as shown below:

In the Claims

Column 7, Claim 10, Line 20, after oscillator loop; insert:
--wherein the charge pump is configured to turn off the oscillator by setting an inverter in the ring oscillator loop of the charge pump to a steady state output;--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*